(12) United States Patent
Li et al.

(10) Patent No.: US 12,561,614 B2
(45) Date of Patent: Feb. 24, 2026

(54) SMART SAMPLING OF NOISY LABELS USING ARTIFICIAL INTELLIGENCE

(71) Applicant: Bank of America Corporation, Charlotte, NC (US)

(72) Inventors: Yvonne Li, Jersey City, NJ (US); Aaron Blogg, New York, NY (US); Nizar Naitlho, Jersey City, NJ (US); Nitesh N. Kadakia, Mountainside, NJ (US)

(73) Assignee: Bank of America Corporation, Charlotte, NC (US)

( * ) Notice: Subject to any disclaimer, the term of this patent is extended or adjusted under 35 U.S.C. 154(b) by 618 days.

(21) Appl. No.: 18/100,307

(22) Filed: Jan. 23, 2023

(65) Prior Publication Data

US 2024/0249181 A1    Jul. 25, 2024

(51) Int. Cl.
*G06N 20/00* (2019.01)

(52) U.S. Cl.
CPC .................................... *G06N 20/00* (2019.01)

(58) Field of Classification Search
CPC ....................................................... G06N 20/00
USPC ............................................. 706/12; 702/19
See application file for complete search history.

(56) References Cited

U.S. PATENT DOCUMENTS

| | | | |
|---|---|---|---|
| 6,122,628 A | 9/2000 | Castelli et al. | |
| 6,353,814 B1 | 3/2002 | Weng | |
| 7,356,187 B2 | 4/2008 | Shanahan et al. | |
| 7,593,903 B2 | 9/2009 | Forman et al. | |
| 7,769,763 B1 | 8/2010 | Bem et al. | |
| 7,937,264 B2 | 5/2011 | Burges et al. | |
| 7,958,096 B2 | 6/2011 | Perrizo | |
| 8,204,838 B2 | 6/2012 | Schwaighofer et al. | |
| 9,165,258 B2 | 10/2015 | Deolalikar et al. | |
| 9,418,148 B2 | 8/2016 | Joshi et al. | |
| 9,652,714 B2 | 5/2017 | Achin et al. | |
| 2002/0161761 A1 | 10/2002 | Forman et al. | |
| 2004/0059697 A1 | 3/2004 | Forman | |
| 2007/0203940 A1 | 8/2007 | Wang et al. | |

(Continued)

FOREIGN PATENT DOCUMENTS

| | | | | |
|---|---|---|---|---|
| WO | WO-2022057321 A1 * | 3/2022 | ............. | H04L 45/02 |
| WO | WO-2022109176 A1 * | 5/2022 | ............. | G06V 10/82 |

(Continued)

*Primary Examiner* — Ruay Ho
(74) *Attorney, Agent, or Firm* — Banner & Witcoff, Ltd.

(57) ABSTRACT

Aspects of the disclosure relate to smart sampling of noisy labels using artificial intelligence. A computing platform may receive a dataset of primarily unlabeled data points. The computing platform may apply undersampling to the unlabeled data points to reduce imbalance. The computing platform may assign a candidate label to each unlabeled data point in the dataset without a human manually labeling the unlabeled data points. The computing platform may compute a heuristic score for each data point and rank the data points based on the heuristic score. The computing platform may subsample the dataset by comparing the heuristic score for each data point against more than one threshold and applying a k-Nearest Neighbors (k-NN) algorithm, with two different k values, to identify untrustworthy labels. The computing platform may provide or transmit a trustworthy resulting dataset to a machine learning (ML) model.

20 Claims, 7 Drawing Sheets

(56) References Cited

U.S. PATENT DOCUMENTS

| | | | |
|---|---|---|---|
| 2008/0086433 A1 | 4/2008 | Schmidtler et al. | |
| 2014/0372346 A1 | 12/2014 | Phillipps et al. | |
| 2015/0379428 A1 | 12/2015 | Dirac et al. | |
| 2017/0236055 A1 | 8/2017 | Lin et al. | |
| 2017/0316348 A1 | 11/2017 | Ghosh et al. | |
| 2018/0300576 A1 | 10/2018 | Dalyac et al. | |
| 2022/0083810 A1 * | 3/2022 | Khanna | G06F 18/2411 |
| 2022/0083815 A1 * | 3/2022 | Khanna | G06F 18/10 |
| 2022/0083900 A1 * | 3/2022 | Khanna | G06F 17/18 |
| 2022/0083901 A1 * | 3/2022 | Khanna | G06N 20/10 |
| 2023/0130619 A1 * | 4/2023 | Ma | G06F 18/27 |
| | | | 702/19 |

FOREIGN PATENT DOCUMENTS

| | | | | |
|---|---|---|---|---|
| WO | WO-2022187040 A1 * | 9/2022 | | G06Q 30/0242 |
| WO | WO-2022216753 A1 * | 10/2022 | | G06F 16/355 |

* cited by examiner

110

Smart Data
Generation
Computing
Platform

120

Enterprise
Computing
Infrastructure

Network
150

100

130

Enterprise Data
Storage Platform

140

Enterprise User
Computing Device

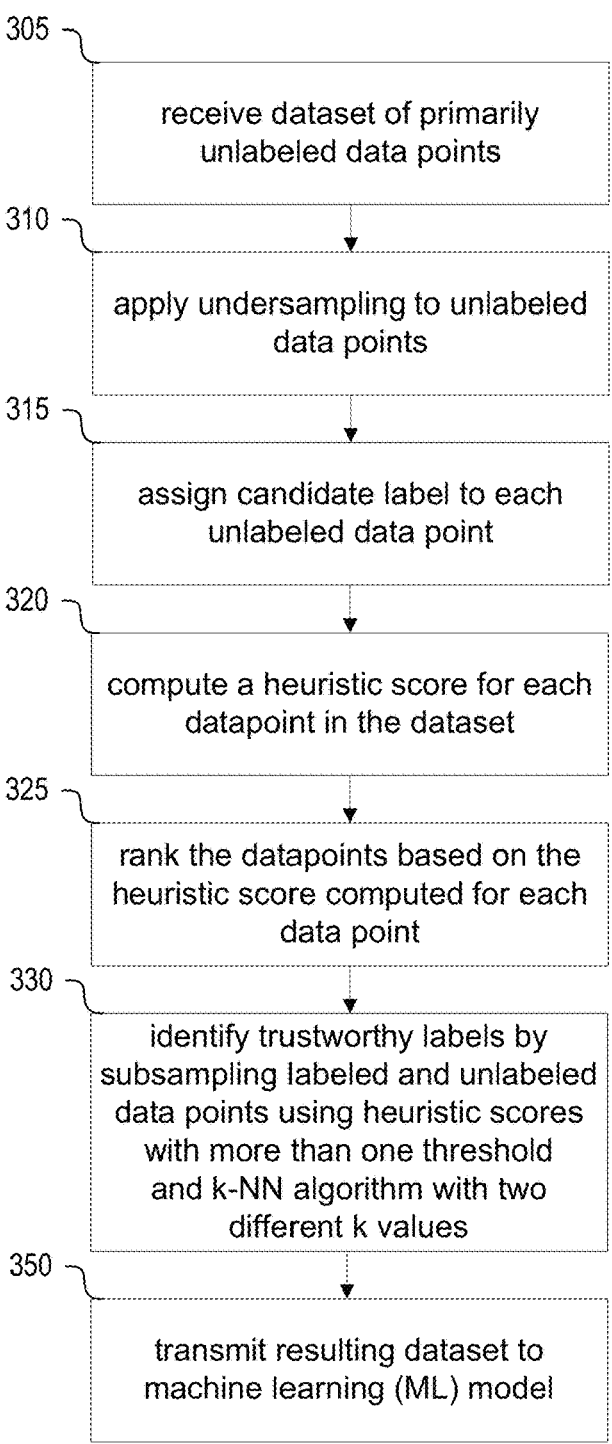

305 — receive dataset of primarily unlabeled data points

310 — apply undersampling to unlabeled data points

315 — assign candidate label to each unlabeled data point

320 — compute a heuristic score for each datapoint in the dataset

325 — rank the datapoints based on the heuristic score computed for each data point 330 — identify trustworthy labels by subsampling labeled and unlabeled data points using heuristic scores with more than one threshold and k-NN algorithm with two different k values 350 — transmit resulting dataset to machine learning (ML) model

SMART SAMPLING OF NOISY LABELS USING ARTIFICIAL INTELLIGENCE

BACKGROUND

Many organizations use machine learning models to assist in the analysis of complex data sets. However, trustworthy analytics outcomes depend on the right data. In some instances, available labels might not be accurate or reliable, which may degrade performance of a machine learning model. For example, inefficiencies and inaccuracies result when subject matter experts manually label the data. In other instances, data might not be collected with the intent of being consumed by a machine learning model, and therefore remain largely unlabeled. Traditional data preparation methodologies such as one-class classification (OCC) method or synthetic minority oversampling technique (SMOTE) fall short of laying the groundwork for an accurate and reliable machine learning model, particularly under scenarios in which a modeling dataset is largely unlabeled, with the small quantity of labeled data being noisy and/or being for only one class. Other traditional approaches rely merely on generic quantitative similarities between data points to classify each point. One or more disadvantages in prior art systems for data preparation in machine learning could be improved by, among other things, smart sampling of noisy labels using artificial intelligence.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues in the prior art with trustworthy data generation for a machine learning model. In some examples, a training dataset may be built, and rules may be applied, to identify whether a data point should be labeled one way or another. Weak labeling and a modified k-Nearest Neighbors (k-NN) algorithm provide a means for filtering out/reducing noisy and/or unreliable data points to obtain a final dataset with improved data trustworthiness. The various machine learning techniques disclosed herein output a resulting dataset that directly improves the accuracy and reliability of a machine learning model as a whole. Systems and methods are disclosed herein for the smart sampling of noisy labels using artificial intelligence.

In accordance with one or more embodiments, a computing platform having at least one processor, and memory may receive, from one or more hardware devices, a dataset of labeled and unlabeled data points. In addition, the dataset may include primarily unlabeled data points. The computing platform may apply undersampling to the unlabeled data points to reduce imbalance between the labeled data points and the unlabeled data points. The computing platform may assign a candidate label to each unlabeled data point in the dataset without a human manually labeling the unlabeled data points. In addition, the candidate label for each unlabeled data point may indicate a negative class, whereas a label for each labeled data point may indicate a positive class. The computing platform may compute a heuristic score for each data point in the dataset. The computing platform may rank the data points in the dataset based on the heuristic score computed for each data point. The computing platform may subsample the dataset by comparing the heuristic score for each data point against more than one threshold and applying a k-Nearest Neighbors (k-NN) algorithm, where k is 1 or 5, to identify untrustworthy labels. In some embodiments, subsampling the unlabeled data points may include: removing unlabeled data points having a heuristic score greater than a first threshold; using a 1-NN algorithm to identify, for each unlabeled data point, a label of its single nearest-neighboring data point; and removing unlabeled data points having a heuristic score greater than a second threshold and where the label of the single nearest-neighboring data point is of the positive class. In addition, the first threshold may be greater than the second threshold. In some embodiments, subsampling the labeled data points may include: removing labeled data points having a heuristic score less than a third threshold; using a 5-NN algorithm to identify, for each labeled data point, labels of its five nearest-neighboring data points; and removing labeled data points having a heuristic score less than a fourth threshold and where the labels of all five of its nearest-neighboring data points are of the negative class. In addition, the third threshold may be less than the fourth threshold. The computing platform may transmit a trustworthy resulting dataset to a machine learning (ML) model.

In one embodiment, the heuristic score may be computed based on a set of predefined rules.

In some embodiments, the heuristic score may be a ranking that is normalized to a number between 0 and 1.

In some arrangements, the first, second, third, and fourth thresholds may be different from one another.

In some examples, the first threshold may be 0.95, the second threshold may be 0.6, the third threshold may be 0.05, and the fourth threshold may be 0.4.

In some example arrangements, the dataset of labeled and unlabeled data points may be obtained from a database of prior financial transactions associated with customer accounts.

In some examples, the ML model may output as a visualization a summary ranking of customer accounts having financial opportunities.

In some arrangements, the ML model may infer a likelihood that an electronic message may include spam.

In some embodiments, the ML model may infer a likelihood that an electronic message may include a subject matter of interest.

In some examples, applying undersampling to the unlabeled data points may include random subsampling to produce a dataset with a predetermined percentage of unlabeled data points.

These and additional aspects will be appreciated with the benefit of the disclosures discussed in further detail below. Moreover, the figures herein illustrate the foregoing embodiments in detail.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 3A depicts an illustrative flowchart of steps performed by a system for smart sampling of noisy labels using artificial intelligence in accordance with one or more example embodiments.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Moreover, the use of "client" and "customer" and variations thereof is meant to broadly cover any human user receiving customer service, and the terms are used interchangeably in this disclosure.

As a general introduction to the subject matter described in more detail below, aspects described herein are directed towards the methods and systems disclosed herein. One aspect of this disclosure provides effective, efficient, scalable, and convenient technical solutions that address various issues associated with the preparation of trustworthy data for machine learning, for example, in scenarios in which a modeling dataset is largely unlabeled, with the small quantity of labeled data being noisy and/or being for only one class.

In contrast to some prior art systems that might rely on high quality (e.g., "noiseless") data, and/or might rely on an adequate number of labels from more than one class, several embodiments disclosed herein use a novel combination of machine learning techniques including weak labeling (e.g., heuristic scoring with more than one threshold selection mechanism) and modified k-Nearest Neighbors (k-NN) algorithm (e.g., with more than one k value) to effectively filter away/reduce data points (e.g., with potentially errant labels) to efficiently identify and automatically obtain a final dataset that is reliable/trustworthy. For example, one or more aspects of the disclosure may output a resulting reliable dataset that directly improves model performance for data analytics as a whole. Additional aspects of the disclosure may incorporate business knowledge in the generation of labels. Further aspects of the disclosure may combine numerical and categorical data to identify whether a data point should be labeled one way or another.

Figure 1A:
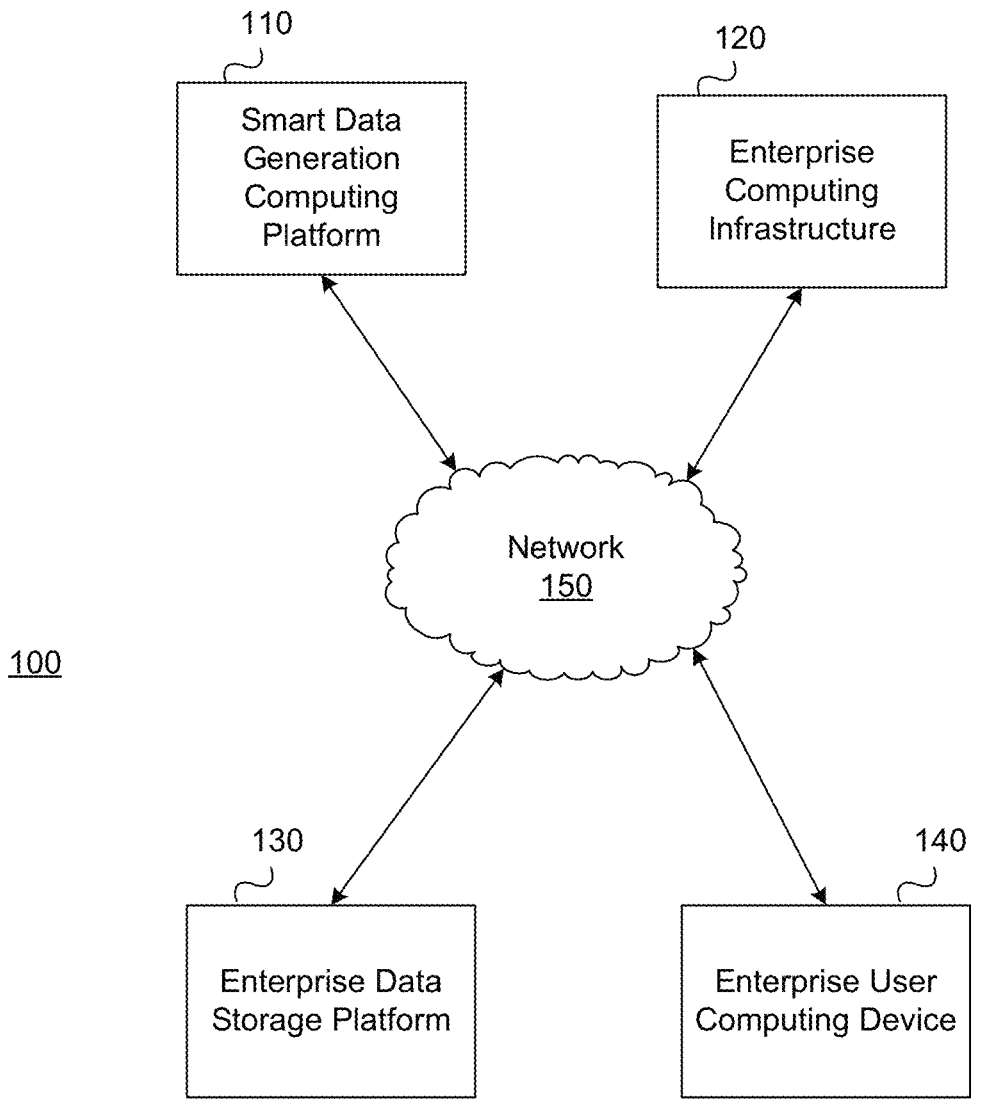
FIGS. 1A and 1B depict a computing environment for smart sampling of noisy labels using artificial intelligence in accordance with one or more example embodiments.
Figure 1B:
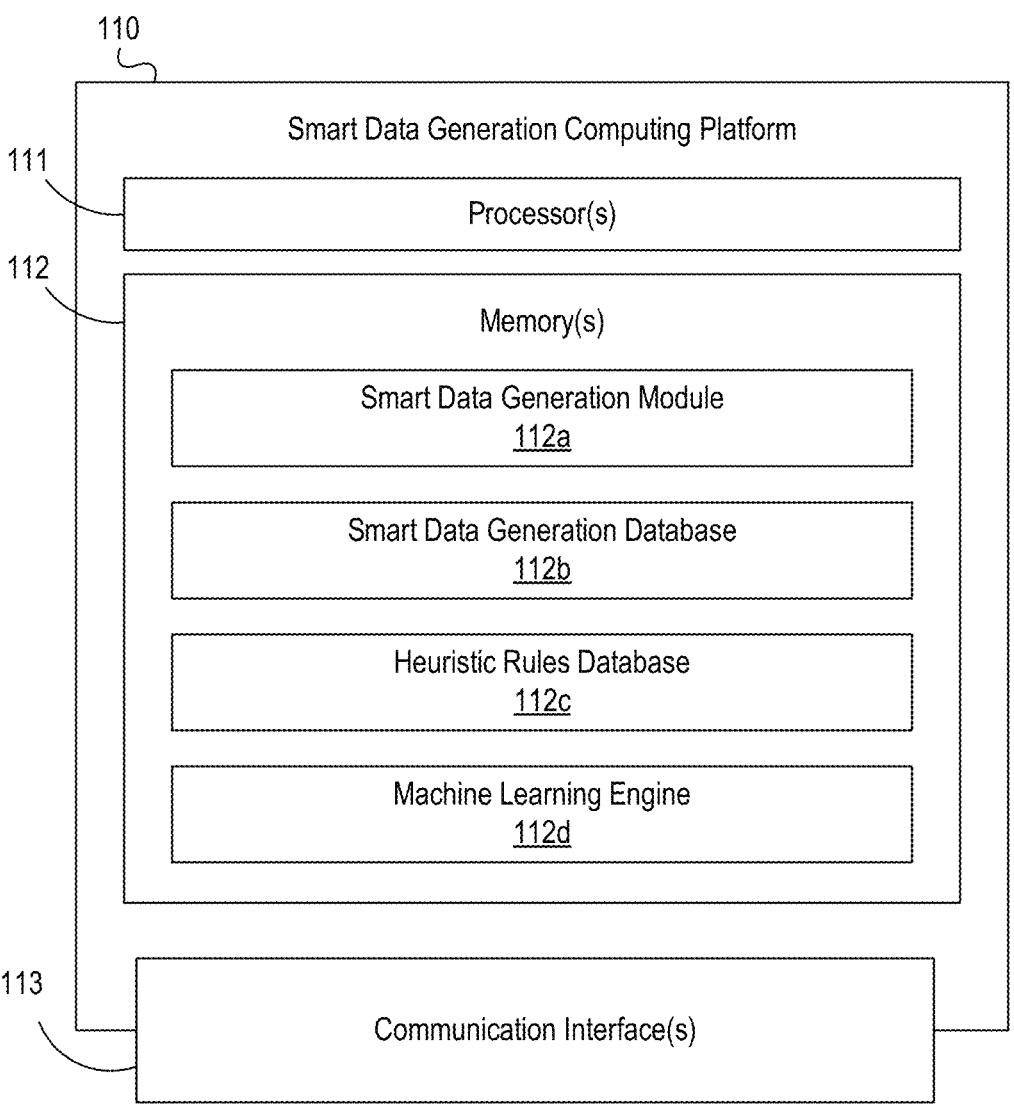

FIGS. 1A and 1B depict an illustrative computing environment for smart data generation in accordance with one or more example embodiments. Referring to FIG. 1A, computing environment 100 may include one or more computing devices and/or other computing systems. For example, computing environment 100 may include smart data generation computing platform 110, enterprise computing infrastructure 120, enterprise data storage platform 130, and enterprise user computing device 140. Although one user computing device is shown for illustrative purposes, any number of user computing devices may be included without departing from the disclosure.

As illustrated in greater detail below, smart data generation computing platform 110 may include one or more computing devices configured to perform one or more of the functions described herein. For example, smart data generation computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more applications. For example, enterprise computing infrastructure 120 may be configured to host, execute, and/or otherwise provide one or more applications, such as, for example, one or more machine learning models, visualization applications, and/or other applications associated with an enterprise organization. In some instances, enterprise computing infrastructure 120 may be configured to provide various enterprise and/or back-office computing functions for an enterprise organization. For example, enterprise computing infrastructure 120 may include various servers and/or databases that store and/or otherwise maintain business information, information associated with business processes, and so forth. In addition, enterprise computing infrastructure 120 may process and/or otherwise execute actions based on information received from other computer systems included in computing environment 100. Additionally or alternatively, enterprise computing infrastructure 120 may receive instructions from smart data generation computing platform 110 and then execute those instructions.

Enterprise data storage platform 130 may include one or more computing devices and/or other computer components (e.g., processors, memories, communication interfaces). addition, and as illustrated in greater detail below, enterprise user computing device 140 may be configured to receive information from, send information to, and/or otherwise exchange information with one or more devices described herein. The location where enterprise data storage platform 130 is deployed may be remote from smart data generation computing platform 110 and/or enterprise computing infrastructure 120 and/or enterprise user computing device 140. In addition, and as illustrated in greater detail below, enterprise data storage platform 130 may be configured to store and/or otherwise maintain enterprise data. For example, enterprise data storage platform 130 may be configured to store and/or otherwise maintain, test datasets, training datasets, transaction data related to various customer accounts, email data related to a plurality of hosts, and so forth. For instance, the information in enterprise data storage platform 130 may be customer records that contain a wealth of information relating to financial transactions, or electronic mail records that contain a wealth of information relating to exchange of electronic mail messages between users (e.g., between customer service advisors and customers). Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Enterprise user computing device 140 may be a personal computing device (e.g., desktop computer, laptop computer) or mobile computing device (e.g., smartphone, tablet, wearable device). In addition, enterprise user computing device 140 may be linked to and/or used by a specific user (who may, e.g., be an administrative user of an organization, such as an administrative user of a financial institution and/or an administrative user of a particular business unit of a financial institution operating smart generation computing platform 110). Also, for example, user of enterprise user computing device 140 may utilize enterprise user computing device 140 to review data associated with customer accounts, visualize data, manage generation of training data, manage generation and/or training of learning models, or the like.

Computing environment 100 also may include one or more networks, which may interconnect one or more of smart data generation computing platform 110, enterprise computing infrastructure 120, enterprise data storage platform 130, and enterprise user computing device 140. For example, computing environment 100 may include network 150. For example, computing environment 100 may include a network 150 (which may interconnect, e.g., smart data generation computing platform 110, enterprise computing infrastructure 120, enterprise data storage platform 130, enterprise user computing device 140, and/or one or more other systems which may be associated with an enterprise organization, such as a financial institution, with one or more other systems, public networks, sub-networks, and/or the like).

In one or more arrangements, smart data generation computing platform 110, enterprise computing infrastructure 120, enterprise data storage platform 130, and enterprise user computing device 140 may be any type of computing device capable of receiving a user interface, receiving input via the user interface, and communicating the received input to one or more other computing devices. For example, smart data generation computing platform 110, enterprise computing infrastructure 120, enterprise data storage platform 130, enterprise user computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, smart data generation computing platform 110 may include one or more processor(s) 111, memory(s) 112, and communication interface(s) 113. A data bus may interconnect processor 111, memory 112, and communication interface 113. Communication interface 113 may be a network interface configured to support communication between smart data generation computing platform 110 and one or more networks (e.g., network 150 or the like). Memory 112 may include one or more program modules having instructions that when executed by processor 111 cause smart data generation computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of smart data generation computing platform 110 and/or by different computing devices that may form and/or otherwise make up smart data generation computing platform 110. For example, memory 112 may have, store, and/or include a smart data generation module 112a, a smart data generation database 112b, a heuristics rules database 112c, and a machine learning engine 112d. Smart data generation module 112a may have instructions that direct and/or cause smart data generation computing platform 110 to perform smart data generation and/or perform other functions, as discussed in greater detail below. Smart data generation database 112b may store information used by smart data generation module 112a and/or smart data generation computing platform 110 in performing smart data generation and/or in performing other functions. Heuristics rules database 112c may store a set of predefined rules (e.g., business rules/heuristics) used by smart data generation module 112a and/or smart data generation computing platform 110 in conducting smart data generation and/or in performing other functions. Machine learning engine 112d may have instructions that direct and/or cause smart data generation computing platform 110 to set, define, and/or iteratively redefine rules, techniques and/or other parameters used by smart data generation computing platform 110 and/or other systems in computing environment 100 in performing smart data generation using machine learning.

Figure 2:
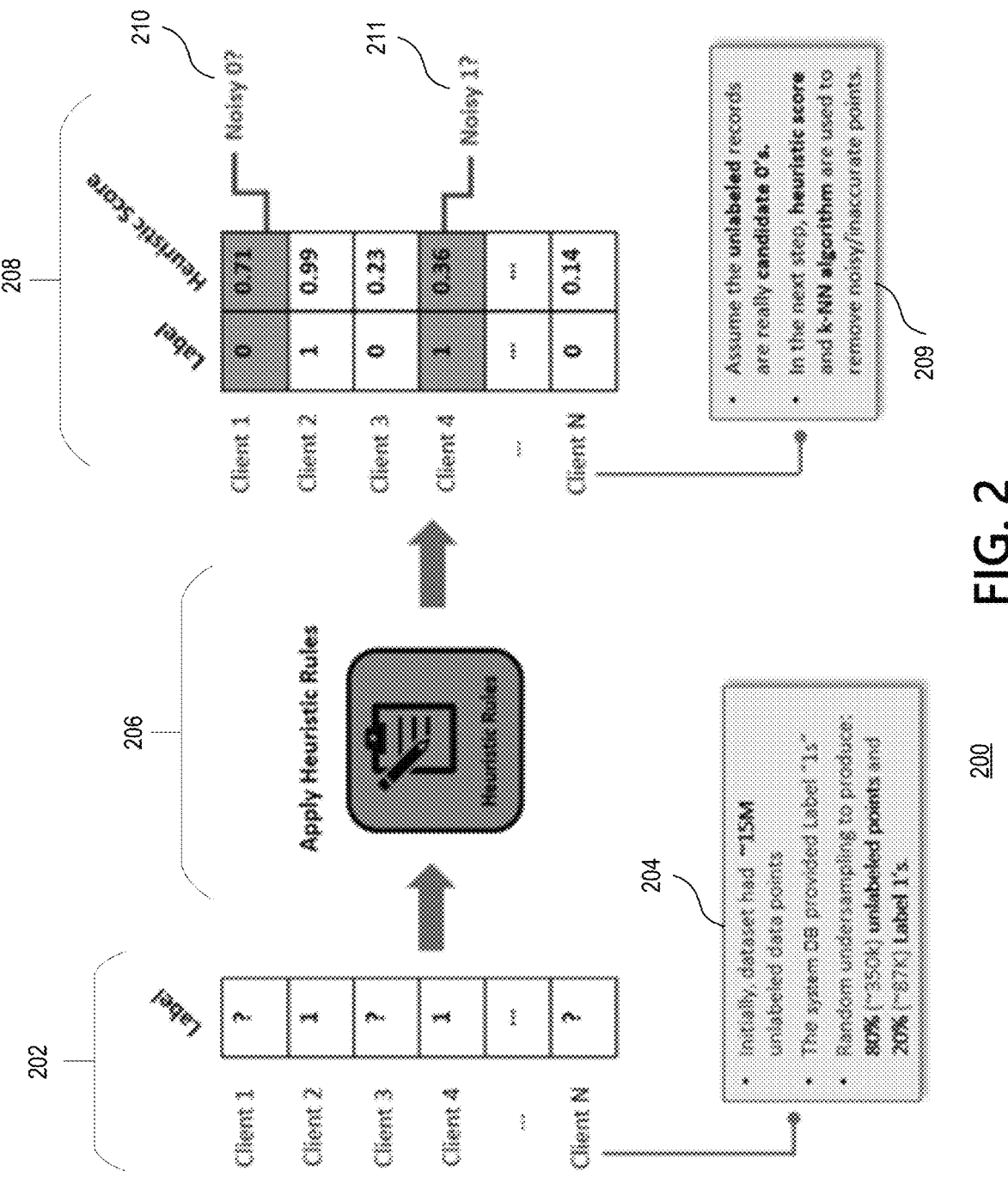
FIG. 2 depicts an illustrative design flow for smart sampling of noisy labels using artificial intelligence accordance with one or more example embodiments.

FIG. 2 depicts an illustrative design flow 200 for smart sampling of noisy labels using artificial intelligence accordance with one or more example embodiments. The events shown in the illustrative event sequence are merely one example sequence and additional events may be added, or events may be omitted, without departing from the disclosure. Further, one or more processes discussed with respect to FIG. 2 may be performed in real-time or near real-time.

By way of background, a framework for machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human mind). Such structures, while significantly more complex than conventional computer systems, are beneficial in implementing machine learning. For example, an artificial neural network may be comprised of a large set of nodes which, like neurons in humans, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator. An embodiment involving unsupervised machine learning is described herein.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 100 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct"). An embodiment involving supervised machine learning is described herein.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

The novel aspects of some embodiments disclosed herein include several key components, including implementing random subsampling, heuristics (e.g., heuristic/business rules), and a modified k-NN algorithm, which are discussed more fully below. In one aspect, referring to FIG. 2, at 202, smart data generation computing platform 110 may receive an initial dataset of labeled and unlabeled data points from one or more hardware devices (e.g., enterprise data storage platform 130) and apply undersampling to the unlabeled data points. In some examples, the initial dataset may be obtained from a database of prior financial transactions associated with customer accounts. In some examples, the initial dataset may include primarily unlabeled data points (e.g., labeled at 202 as "?") and/or a small quantity of labeled data points (e.g., labeled at 202 as "1").

In some examples, random subsampling/undersampling may be applied on the unlabeled data to reduce imbalance between the labeled data points and the unlabeled data points. For instance, smart data generation computing platform 110 may randomly subsample the unlabeled data points to produce a dataset with a predetermined percentage of unlabeled data points. In one non-limiting example, at 204, based on an initial dataset that includes largely unlabeled data points (e.g., 15 million) and some labeled data points (e.g., labeled "1"), smart data generation computing platform 110 may randomly subsample the unlabeled data to produce an initial dataset with about 80% (e.g., about 350 k) unlabeled data and about 20% (e.g., about 87 k) labeled data.

In further aspect, at 206, smart data generation computing platform 110 may apply business rules/heuristics to the data and use heuristic rules to rank the data. For example, a set of business rules may be developed by an enterprise team. These business rules may be based on metrics derived from a subset of model input features. Smart data generation computing platform 110 may calculate rule-based metrics for each data point and convert each metric value into a relative ranking. Thereafter, at 208, smart data generation computing platform 110 may compute a final ranking for each data point as a weighted sum of the individual metric rankings for that point. The final ranking may be normalized to produce a score (i.e., heuristic score) between 0 and 1. This rule-based score (i.e., heuristic score) encodes the business' logic and provides an indication of whether a data point should be labeled one way or another. For example, a higher score may signify customer accounts having better financial opportunities (e.g., better tax loss harvesting opportunities). In another example, a higher score may signify a likelihood that an electronic message comprises spam. In some examples, a higher score may signify a likelihood that an electronic message comprises a subject matter of interest (e.g., whether an electronic message is a customer complaint or not). In this way, the heuristic score may be applied at scale to the large number of data points and efficiently identify potential noisy or inaccurate labels.

Then, after the applying the heuristic rules, the smart data generation computing platform 110 may, as indicated in 209, apply a modified k-NN algorithm (e.g., k-NN undersampling) to refine the data. k-NN works on the basis of feature similarity and allows to measure how comparable data points are in the feature space. A novel k-NN undersampling method in combination with the heuristic score may be applied to identify potential untrustworthy labels by comparing them with labels from a sample point's nearest neighbors.

In some embodiments, labeled/unlabeled data points that have a counterintuitive ranking may be filtered out. For instance, referring to FIG. 2 at 208, the data point belonging to "Client 1" is labeled "0", but has a relatively high heuristic score of 0.71. Thus, this data point may be considered a noisy/inaccurate point (e.g., a "Noisy 0"). In addition, the data point belonging to "Client 4" is labeled "1", but has having a relatively low heuristic score of 0.36. Thus, this data point may be considered a noisy/inaccurate point (e.g., a "Noisy 1"). Smart data generation computing platform 110 may remove both noisy points at 210 and 211 to refine the data.

Figure 3B:
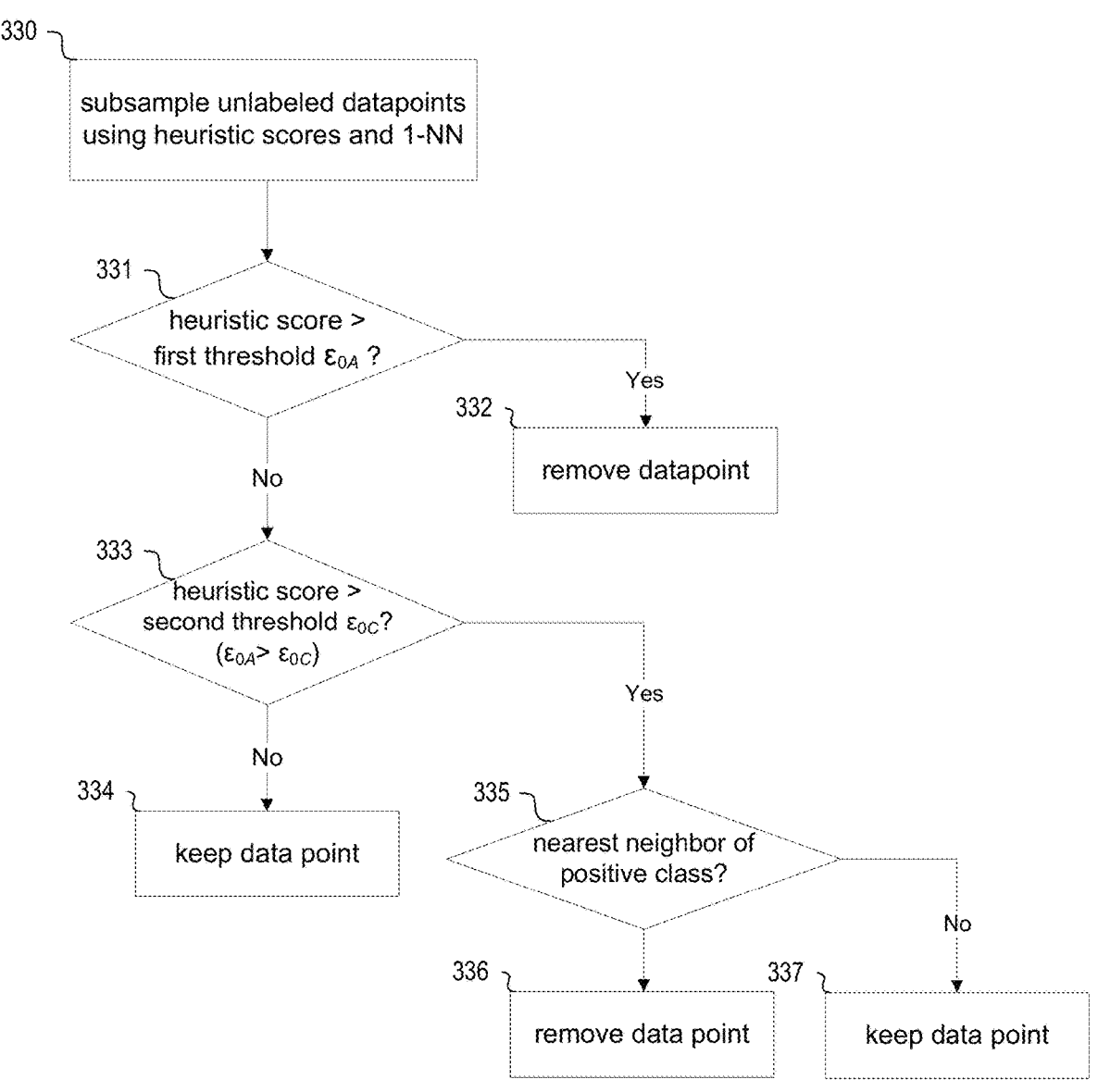
FIG. 3B depicts an illustrative flowchart of more detailed steps performed by a system for smart sampling of noisy labels using artificial intelligence in accordance with one or more example embodiments.
Figure 3C:
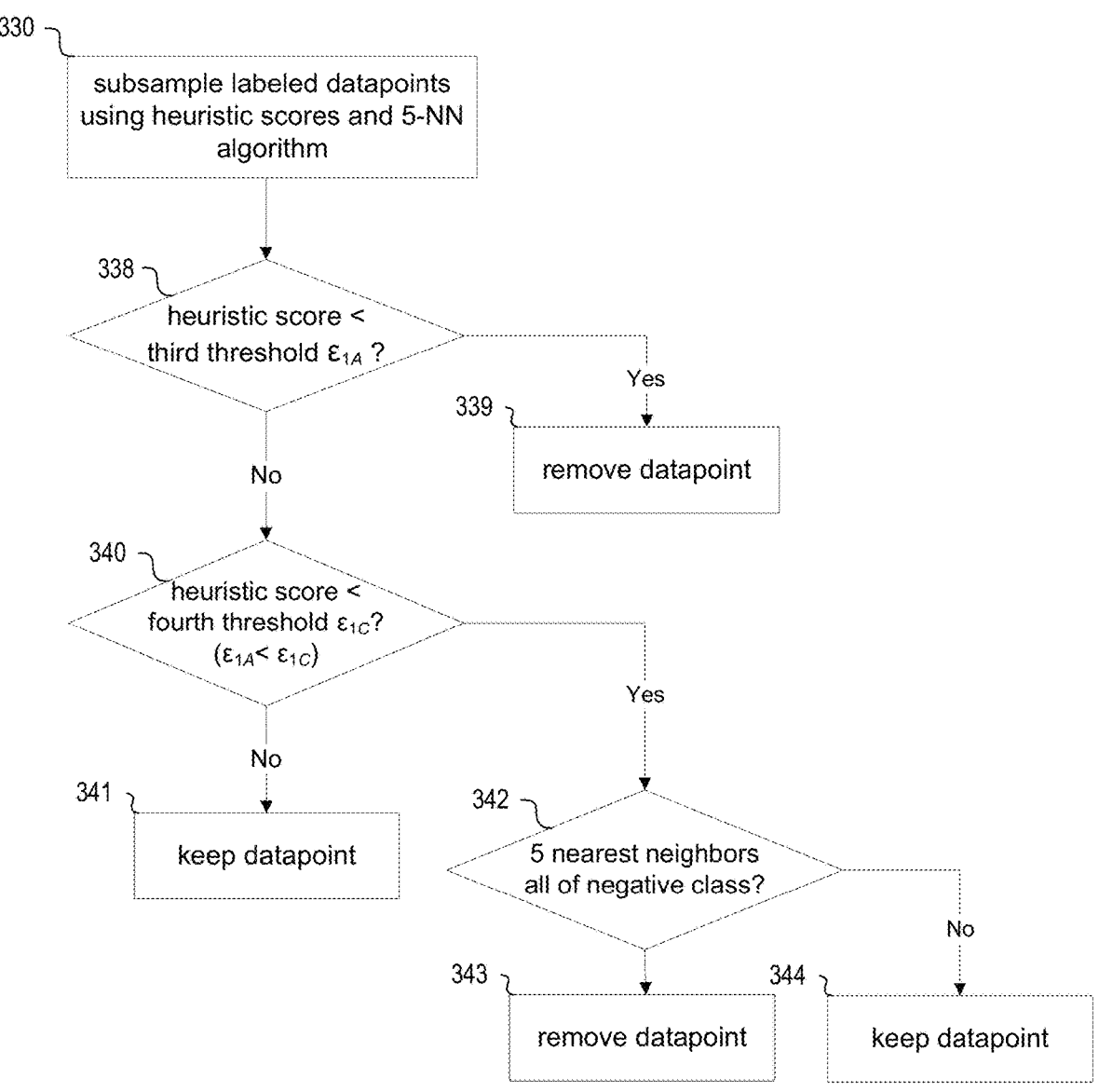
FIG. 3C depicts an illustrative flowchart of more detailed steps performed by a system for smart sampling of noisy labels using artificial intelligence in accordance with one or more example embodiments.
Figure 4:
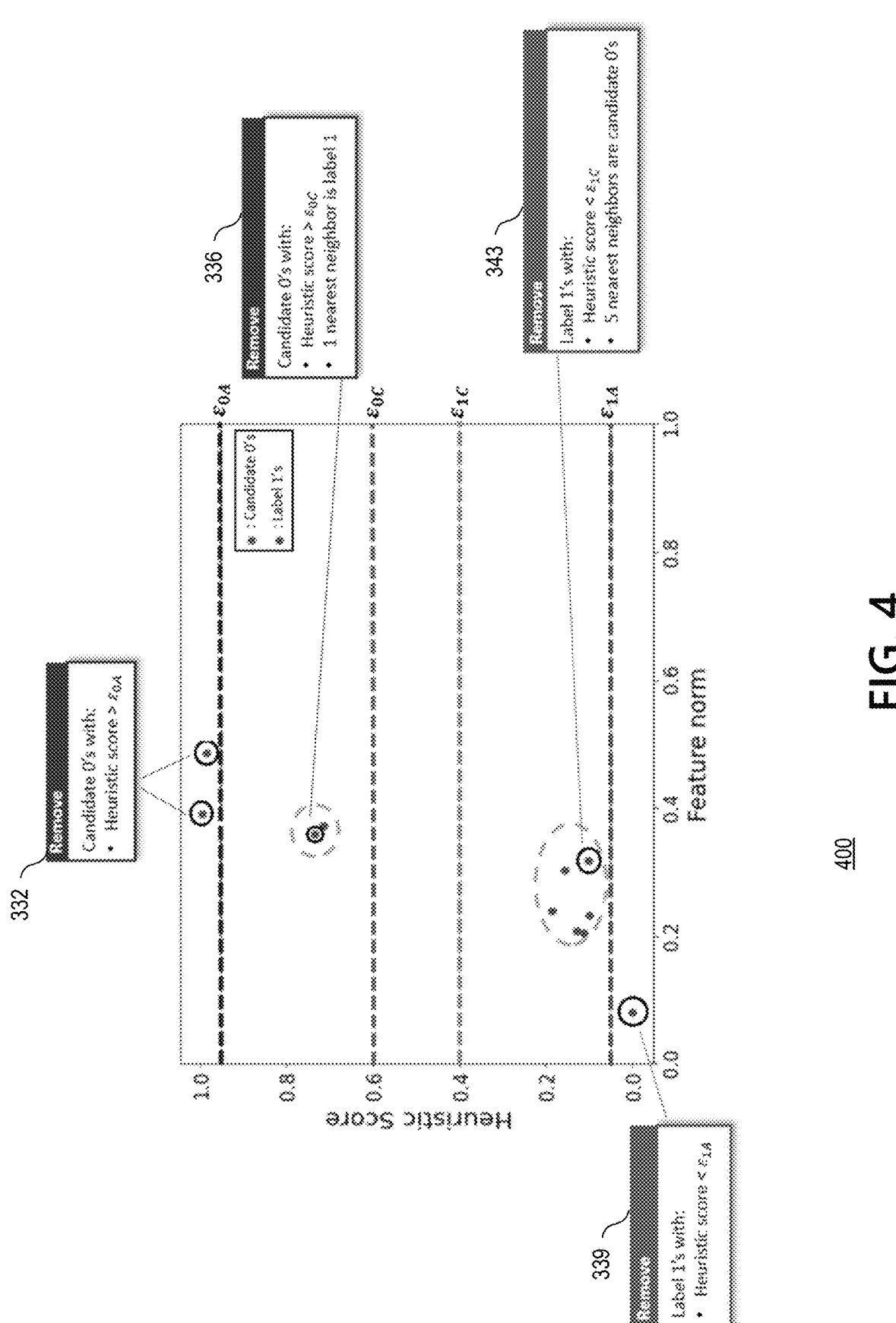
FIG. 4 depicts an illustrative graph for smart sampling of noisy labels using artificial intelligence accordance with one or more example embodiments.

FIGS. 3A-3C illustrate a flowchart 300 of steps performed, in some examples, by smart data generation computing platform 110, to smart sample noisy labels using artificial intelligence. For example, the flowchart 300 illustrates some steps performed by a smart data generation computing platform 110, which is sometimes used by an expert user (e.g., a financial advisor, a supervisory user, a customer service advisor, or other user/subsystem), to smart sample noisy labels and expeditiously remove those data points that are identified as likely being untrustworthy and/or keep those data points that are identified as likely being of a target class. FIG. 4 depicts an illustrative graph 400 for smart sampling of noisy labels using artificial intelligence accordance with one or more example embodiments. For purposes of illustration, FIGS. 3A-3C and FIG. 4 will be discussed together.

Referring to FIG. 3A, at step 305, a computing platform may receive, from one or more hardware devices, a dataset of labeled and unlabeled data points. The dataset may include primarily unlabeled data points. At step 310, the computing platform may apply undersampling to the unlabeled data points to reduce imbalance between the labeled data points and the unlabeled data points. At step 315, the computing platform may assign a candidate label to each unlabeled data point in the dataset without a human manually labeling the unlabeled data points. The candidate label for each unlabeled data point indicates a negative class (e.g., labeled "0") and a label for each labeled data point indicates a positive/target class (e.g., labeled "1"). At step 320, the computing platform may compute a heuristic score for each data point in the dataset. At step 325, the computing platform may rank the data points in the dataset based on the heuristic score computed for each data point. At step 330, the computing platform may subsample the dataset (e.g., filter out untrustworthy data points) by comparing the heuristic score for each data point against more than one threshold and applying a k-Nearest Neighbors (k-NN) algorithm, with two different k values, to identify untrustworthy labels. At step 350, the computing platform may provide or transmit a trustworthy resulting dataset to a machine learning (ML) model. Additionally or alternatively, in some embodiments, the ML model may output as a visualization a summary ranking of customer accounts having financial opportunities to guide a financial adviser to service such customers. In some examples, the generated ranking may be displayed on a graphical user interface (GUI) of a device screen (e.g., a financial advisor's) so that the advisor can take appropriate action based on this information.

FIG. 3B is a flowchart, which expands on block 330 shown in FIG. 3A for subsampling labeled and unlabeled data points using heuristic scores with more than one threshold selection mechanism and k-NN algorithm with two different k values. For example, an embodiment may support subsampling unlabeled datapoints using heuristic scores and 1-NN.

Referring to FIG. 3B, at step 330, in subsampling the unlabeled datapoints using heuristic scores and 1-NN, the computing platform may begin by comparing heuristic scores of each unlabeled data point to a first predetermined threshold (e.g., $\varepsilon_{0A}$). In some examples, if it is determined in decision block 331, that the unlabeled data point has a heuristic score greater than the first threshold (e.g., $\varepsilon_{0A}$), the computing platform may remove/exclude the unlabeled data point at block 332. Some illustrative examples of such data points are shown in FIG. 4 at 332. If it is determined in decision block 331, that the unlabeled data point has a heuristic score is not greater than the first threshold (e.g., $\varepsilon_{0A}$), the computing platform may further compare the heuristic score of the unlabeled data point to a second predetermined threshold (e.g., $\varepsilon_{0C}$), where the first threshold is greater than the second threshold (e.g., $\varepsilon_{0A} > \varepsilon_{0C}$), but the second threshold (e.g., $\varepsilon_{0C}$) is still considered a relatively high score. In some examples, if it is determined in decision block 333, that the unlabeled data point has a heuristic score not greater than the second threshold (e.g., $\varepsilon_{0C}$), the computing platform may, at block 334, keep the data point.

In some examples, if it is determined in decision block 333, that the unlabeled data point has a heuristic score greater than the second threshold (e.g., $\varepsilon_{0C}$), the computing platform may use a 1-NN algorithm to identify, for each unlabeled data point, a label of its single nearest-neighboring data point. If it is determined in decision block 335, that the label of its single nearest-neighboring data point is of the positive class (e.g., labeled "1"), the computing platform may, at block 336, exclude/remove the data point. An illustrative example of such a data point is shown in FIG. 4 at 336. If it is determined in decision block 335, that the label of its single nearest-neighboring data point is not of the positive class (e.g., is of the negative class, or labeled "0"), the computing platform may, at block 337, keep the data point. Thereby, the computing platform may exclude unlabeled data points having a heuristic score greater than the second threshold (e.g., $\varepsilon_{0C}$) and where the label of the single nearest-neighboring data point is of the positive class (e.g., labeled "1"). In other words, the unlabeled data points may be assumed to belong to the negative class (e.g., assumed to be 0's). Subsequently, points that might actually belong to the positive class (e.g., labeled 1's) are filtered out using a combination of the heuristic score and 1-NN algorithm. In one example embodiment, the first threshold (e.g., $\varepsilon_{0A}$) might be 0.95 and the second threshold (e.g., $\varepsilon_{0C}$) might be 0.6, but other or fewer thresholds with other values are also contemplated without departing from the scope of the disclosure.

FIG. 3C is a flowchart, which expands on block 330 shown in FIG. 3A for subsampling labeled and labeled data points using heuristic scores with more than one threshold selection mechanism and k-NN algorithm with two different k values. For example, an embodiment may support subsampling labeled datapoints using heuristic scores and 5-NN.

Referring to FIG. 3C, at step 330, in subsampling the labeled datapoints using heuristic scores and 5-NN, the computing platform may begin by comparing heuristic scores of each labeled data point to a third predetermined threshold (e.g., $\varepsilon_{1A}$). In some examples, if it is determined in decision block 338, that the labeled data point has a heuristic score less than the third threshold (e.g., $\varepsilon_{1A}$), the computing platform may remove/exclude the labeled data point at block 339. An illustrative example of such a data point is shown in FIG. 4 at 339. If it is determined in decision block 338, that the labeled data point has a heuristic score is not less than the third threshold (e.g., $\varepsilon_{1A}$), the computing platform may further compare the heuristic score of the labeled data point to a fourth predetermined threshold (e.g., $\varepsilon_{1C}$), where the third threshold is less than the fourth threshold (e.g., $\varepsilon_{1A} < \varepsilon_{1C}$), but the fourth threshold (e.g., $\varepsilon_{1C}$) is still considered a relatively low score. In some examples, if it is determined in decision block 340, that the labeled data point has a heuristic score not less than the fourth threshold (e.g., $\varepsilon_{1C}$), the computing platform may, at block 341, keep the data point.

In some examples, if it is determined in decision block 340, that the labeled data point has a heuristic score less than the fourth threshold (e.g., $\varepsilon_{1C}$), the computing platform may use a 5-NN algorithm to identify, for each labeled data point, the labels of its five nearest-neighboring data points. If it is determined in decision block 342, that the labels of all five of its nearest-neighboring data points are of the negative class (e.g., labeled "0"), the computing platform may, at block 343, exclude/remove the data point. An illustrative example of such a data point is shown in FIG. 4 at 343. If it is determined in decision block 342, that the labels of the nearest-neighboring five data points are not all of the negative class (e.g., at least some are of the positive class or labeled "1"), the computing platform may, at block 344, keep the data point. Thereby, the computing platform may exclude labeled data points having a heuristic score less than the fourth threshold (e.g., $\varepsilon_{1C}$) and where all five of its nearest-neighboring data points are of the negative class (e.g., labeled "0"). Thereby, positive labeled points (e.g., labeled 1's) that might actually belong to the negative class (e.g., labeled 0's) are filtered out using a combination of the heuristic score and 5-NN algorithm. In one example embodiment, the third threshold (e.g., $\varepsilon_{1A}$) might be 0.05 and the fourth threshold (e.g., $\varepsilon_{1C}$) might be 0.4, but other or fewer thresholds with other values are also contemplated without departing from the scope of the disclosure.

Notably, the system (e.g., smart data generation computing platform 110) does not merely resort to a banal supervised labeling approach. A manually intensive approach in which a squadron of expert/supervisory users spent countless hours to label each data point stored in a data store (e.g., enterprise data storage platform 130) would be untenable. Some of the most common unsupervised machine learning approaches to that support a training set having one class and unlabeled (e.g., mixed) sample points include Support Vector Machines (SVM)-based One-Class Classification (OCC) would also be inadequate. Moreover, a generic rules-based decision engine or common oversampling, undersampling, or synthetic minority oversampling technique (SMOTE) are other less sophisticated data preparation tools. These off-the-shelf algorithms are inadequate, by themselves, for the disclosed computing platform 110 for various reasons. For starters, supervised learning algorithms typically require training data to have a trustworthy label, but given an untrustworthy (or no) label, such approaches are inadequate. Traditional OCC and other unsupervised methods also typically assume that the sample of positive labeled data is trustworthy. Instead, the disclosed system relies on one or more sophisticated unsupervised learning approaches. Smart data generation computing platform 110 improves upon data preparation approaches by ensuring that the training of the ML model does not rely on potentially errant labels (e.g., training a ML model without labels) and the ML model's output is flexible to assign labels of more than one class to data points in a given dataset. In fact, using the heuristics score and k-NN undersampling method disclosed herein, the disclosed smart sampling method is flexible enough to build a robust machine learning model from a modeling dataset that is largely unlabeled and imbalanced.

The ML model combines numerical, categorical, and/or text-based data to quantify the likelihood (e.g., between 0 and 1) that a data point should be labeled one way or another. The ML engine (e.g., ML engine 112*d*) then uses this final score to display assessment indicators to users (e.g., financial advisors). For example, the final score may be used to rank clients and help financial advisors prioritize potential tax loss harvesting opportunities.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. One or more aspects of the disclosure may be embodied in computer-usable data or computer-executable instructions, such as in one or more program modules, executed by one or more computers or other devices to perform the operations described herein.

Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

We claim:

1. A smart subsampling method for constructing a trustworthy training dataset for machine learning using a k-Nearest Neighbors (k-NN) algorithm with different k values and more than one threshold selection mechanism, the method comprising:

at a computing platform comprising at least one processor, and memory:

receiving, from one or more hardware devices, a dataset of labeled and unlabeled data points, wherein the dataset comprises primarily unlabeled data points;

applying undersampling to the unlabeled data points to reduce imbalance between the labeled data points and the unlabeled data points;

assigning a candidate label to each unlabeled data point in the dataset without a human manually labeling the unlabeled data points, wherein the candidate label for each unlabeled data point indicates a negative class and a label for each labeled data point indicates a positive class;

computing a heuristic score for each data point in the dataset;

ranking the data points in the dataset based on the heuristic score computed for each data point;

subsampling the dataset by comparing the heuristic score for each data point against more than one threshold and applying a k-Nearest Neighbors (k-NN) algorithm, where k is 1 or 5, to identify untrustworthy labels, wherein subsampling the unlabeled data points comprises:

removing unlabeled data points having a heuristic score greater than a first threshold;

using a 1-NN algorithm to identify, for each unlabeled data point, a label of its single nearest-neighboring data point; and removing unlabeled data points having a heuristic score greater than a second threshold and where the label of the single nearest-neighboring data point is of the positive class, wherein the first threshold is greater than the second threshold, and wherein subsampling the labeled data points comprises:

removing labeled data points having a heuristic score less than a third threshold;

using a 5-NN algorithm to identify, for each labeled data point, labels of its five nearest-neighboring data points; and removing labeled data points having a heuristic score less than a fourth threshold and where the labels of all five of its nearest-neighboring data points are of the negative class, wherein the third threshold is less than the fourth threshold; and transmitting a trustworthy resulting dataset to a machine learning (ML) model.

2. The method of claim 1, wherein the heuristic score is a ranking that is normalized to a number between 0 and 1.

3. The method of claim 1, wherein the first, second, third, and fourth thresholds are different from one another.

4. The method of claim 1, wherein the first threshold is 0.95, the second threshold is 0.6, the third threshold is 0.05, and the fourth threshold is 0.4.

5. The method of claim 1, wherein the dataset of labeled and unlabeled data points is obtained from a database of prior financial transactions associated with customer accounts.

6. The method of claim 1, wherein the ML model outputs as a visualization a summary ranking of customer accounts having financial opportunities.

7. The method of claim 1, wherein the ML model infers a likelihood that an electronic message comprises spam.

8. The method of claim 1, wherein the ML model infers a likelihood that an electronic message comprises a subject matter of interest.

9. The method of claim 1, wherein applying undersampling to the unlabeled data points comprises random subsampling to produce a dataset with a predetermined percentage of unlabeled data points.

10. The method of claim 1, wherein the heuristic score is computed based on a set of predefined rules.

11. A system configured to construct a trustworthy training dataset for machine learning from a dataset of primarily unlabeled data points, the system comprising:

one or more processors; and memory storing a software package that, when executed by the one or more processors, cause the system to:

receive a dataset of labeled and unlabeled data points, wherein the dataset comprises primarily unlabeled data points;

apply undersampling to the unlabeled data points to reduce imbalance between labeled data points and the unlabeled data points;

assign a candidate label to each unlabeled data point in the dataset without a human manually labeling the unlabeled data points, wherein the candidate label for each unlabeled data point indicates a negative class and a label for each labeled data point indicates a positive class;

compute a heuristic score for each data point in the dataset;

rank the data points in the dataset based on the heuristic score computed for each data point;

subsample the dataset, via a software package, by comparing the heuristic score for each data point against more than one threshold and applying a k-Nearest Neighbors (k-NN) algorithm, where k is 1 or 5, to identify untrustworthy labels, wherein subsampling the unlabeled data points comprises:

removing unlabeled data points having a heuristic score greater than a first threshold;

using a 1-NN algorithm to identify, for each unlabeled data point, a label of its single nearest-neighboring data point; and removing unlabeled data points having a heuristic score greater than a second threshold and where the label of the single nearest-neighboring data point is of the positive class, wherein the first threshold is greater than the second threshold, and wherein the subsampling the labeled data points comprises:

removing labeled data points having a heuristic score less than a third threshold;

using a 5-NN algorithm to identify, for each labeled data point, labels of its five nearest-neighboring data points; and removing labeled data points having a heuristic score less than a fourth threshold and where the labels of all five of its nearest-neighboring data points are of the negative class, wherein the third threshold is less than the fourth threshold; and transmit a trustworthy resulting dataset to a machine learning (ML) model.

12. The system of claim 11, wherein the heuristic score is a ranking that is normalized to a number between 0 and 1.

13. The system of claim 11, wherein the first, second, third, and fourth thresholds are different from one another.

14. The system of claim 11, wherein the first threshold is 0.95, the second threshold is 0.6, the third threshold is 0.05, and the fourth threshold is 0.4.

15. The system of claim 11, wherein the dataset of labeled and unlabeled data points is obtained from a database of prior financial transactions associated with customer accounts.

16. The system of claim 11, wherein the ML model outputs as a visualization a summary ranking of customer accounts having financial opportunities.

17. The system of claim 11, wherein the ML model infers a likelihood that an electronic message comprises spam.

18. The system of claim 11, wherein applying undersampling to the unlabeled data points comprises random subsampling to produce a dataset with a predetermined percentage of unlabeled data points.

19. The system of claim 11, wherein the heuristic score is computed based on a set of predefined rules.

20. A method for executing a machine learning (ML) model, the method comprising:

at a computing platform comprising at least one processor, and memory:

training a machine learning (ML) model;

testing the ML model; and deploying the ML model, wherein the ML model is trained by:

receiving, from one or more hardware devices, a dataset of labeled and unlabeled data points, wherein the dataset comprises primarily unlabeled data points;

applying undersampling to the unlabeled data points to reduce imbalance between the labeled data points and the unlabeled data points;

assigning a candidate label to each unlabeled data point in the dataset without a human manually labeling the unlabeled data points, wherein the candidate label for each unlabeled data point indicates a negative class and a label for each labeled data point indicates a positive class;

computing a heuristic score for each data point in the dataset;

ranking the data points in the dataset based on the heuristic score computed for each data point;

subsampling the dataset by comparing the heuristic score for each data point against more than one threshold and applying a k-Nearest Neighbors (k-NN) algorithm, where k is 1 or 5, to identify untrustworthy labels, wherein subsampling the unlabeled data points comprises:

removing unlabeled data points having a heuristic score greater than a first threshold;

using a 1-NN algorithm to identify, for each unlabeled data point, a label of its single nearest-neighboring data point; and removing unlabeled data points having a heuristic score greater than a second threshold and where the label of the single nearest-neighboring data point is of the positive class, wherein the first threshold is greater than the second threshold, and wherein subsampling the labeled data points comprises:

removing labeled data points having a heuristic score less than a third threshold;

using a 5-NN algorithm to identify, for each labeled data point, labels of its five nearest-neighboring data points; and removing labeled data points having a heuristic score less than a fourth threshold and where the labels of all five of its nearest-neighboring data points are of the negative class, wherein the third threshold is less than the fourth threshold; and transmitting a trustworthy resulting dataset to a machine learning (ML) model.

* * * * *